Aug. 26, 1958 NAOJIRO MATSUO ET AL 2,849,524

FLOW INTERRUPTER FOR MERCURY CELL BATTERY CIRCUITS

Filed March 25, 1953 2 Sheets-Sheet 1

INVENTORS
Naojiro MATSUO, Shogo FUJIOKA and Masahiko MUROZUMI
BY
Attorney

FLOW INTERRUPTER FOR MERCURY CELL BATTERY CIRCUITS

Filed March 25, 1953 2 Sheets-Sheet 2

INVENTORS
Naojiro MATSUO, Shogo FUJIOKA
and Masahiko MUROZUMI
BY
Attorney 2,849,524
Patented Aug. 26, 1958

2,849,524

FLOW INTERRUPTER FOR MERCURY CELL BATTERY CIRCUITS

Naojiro Matsuo, Musashino, Shogo Fujioka, Osaka, and Masahiko Murozumi, Kamakura, Japan, assignors to Asahi Garasu Kabushiki Kaisha, Tokyo, Japan, a corporation of Japan Application March 25, 1953, Serial No. 344,496

Claims priority, application Japan March 28, 1952

5 Claims. (Cl. 174—15)

The present invention relates to the improvement in the process for operating electrolytic alkali-chlorine cell by the mercury process.

A principal object of the present invention is in the operation of an electrolytic alkali-chlorine cell by the mercury process to provide for efficient operation by insulating to avoid short circuits in an extremely simple manner, whereby numerous electrolytic cells may be connected in series, and one common amalgam decomposer therefor may be employed.

Other objects, features and advantages of the present invention will be apparent from the following detailed description.

The electrolytic alkali-chlorine cell for use in the mercury process, which has usually been used or suggested, consists of an electrolyzer and amalgam decomposer which are not electrically insulated from each other. Thus, each electrolytic cell has to be provided with one amalgam decomposer for one electrolyzer, because, if one amalgam decomposer is employed for two or more than two electrolyzers, all the cathodes of those electrolyzers are connected electrically with each other through mercury, which renders impossible an electrolysis with a number of electrolytic cells being connected in series. For instance, since as many amalgam decomposers are required as there are electrolyzers, even when the so-called longitudinal type of amalgam decomposer is employed, which is said to provide a considerable economy in the floor area, a considerable floor space is needed for the decomposers. Further disadvantages reside in the fact that numerous pieces of equipment are needed, higher installation cost and higher consumption of power resulting therefrom. Furthermore, the concentration of caustic alkali obtained in individual amalgam decomposers varies more or less, and the product possesses disadvantages, for example, deficiency in uniformity and others. Moreover, though the amalgam decomposers are all in alalogous conditions in reference to the electric current passed therethrough, the concentration of sodium remaining in the mercury returning to the electrolyser from each amalgam decomposer is not always the same. In consequence, the condition of the respective electrolysers, through which mercury with different concentrations of remaining sodium is recycled, is not constant, which is accompanied by extremely disadvantageous effects. In addition, a great deal of caution in the control of operations is necessary, and labour and expenses are caused thereby. Thus, loss incurred is also exceedingly high. Further disadvantages in such conventional processes for operating electrolysers reside in the insulation necessitated for prefectly preventing leakage current in many places which is troublesome, because the electrolyser and amalgam decomposer are not electrically insulated from each other. Said insulation could not be accomplished unless they are insulated from the ground, for example, by supporting the said amalgam decomposer on a porcelain insulator, and further by insulating all the distributing piping connected to the said amalgam decomposer and also the mechanical apparatus.

According to the present invention, the aforementioned disadvantages may be eliminated thoroughly. A mercury transporting device is so arranged between each one of a plurality of electrolysers and a common amalgam decomposer, that the mercury or the amalgam only may be transmitted with the electric current being insulated from flowing the amalgam or the mercury and also respectively between distributor and each one of the electrolysers for the same purpose. Thus, the use of one common amalgam decomposer is possible for more than two electrolysers by insulating the electric current in the flowing amalgam or mercury by means of the said transporting device. Therefore, according to the present invention, less equipment is required, the required floor space is reduced, electric power is saved, and the operational control is much simplified. In addition, since amalgam from all electrolysers can be decomposed in one single amalgam decomposer, the concentration of caustic soda will be constant, the product will become uniform and the amalgam to be led from the decomposer to electrolyser will be of the same concentration of residual sodium throughout all the electrolysers. In consequence, all the electrolysers are made identical in conditions, the operation being advantageously simplified.

The present invention is, of course, applicable to electrolysers and amalgam decomposer of any suitable type, either vertical or horizontal or other types, the special effect of the invention being obtaintable as described above.

In order that the present invention may be more clearly understood, the following description will be given in reference to the accompanying schematic drawings illustrative of embodiments of the present invention, in which:

Fig. 2 is a longitudinal section thereof;

Fig. 3 is a cross section along the line III—III of the transporting device as shown in Fig. 2;

Figs. 4 and 5 are cross sections along the lines IV—IV and V—V respectively of the transporting device of Fig. 2;

Figs. 6 to 8 show another embodiment of a vertical type mercury transporting device, of which Fig. 6 is a longitudinal section thereof; Fig. 7 is a cross sectional view taken along the line VII—VII of Fig. 6, and Fig. 8 is a horizontal sectional view taken along the line VIII—VIII of Fig. 6.

Figure 1:
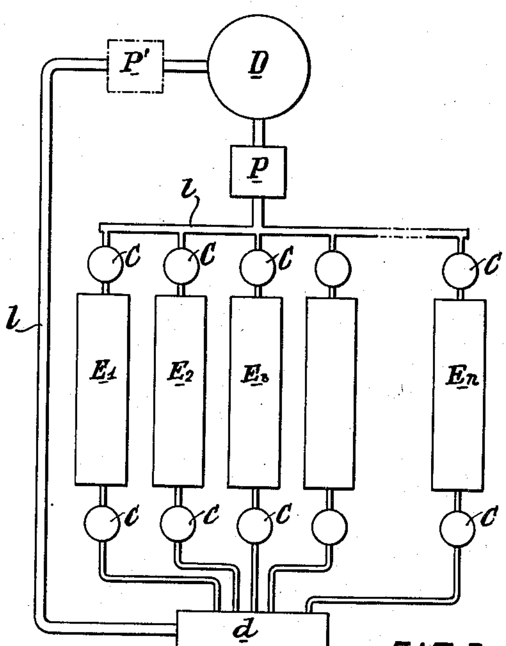
Fig. 1 illustrates one example of an embodiment of a process for operating electrolytic cells according to the invention, in which one amalgam decomposer is commonly employed for a number of electrolysers arranged in series.

In the drawings Fig. 1 illustrates an embodiment in which one common amalgam decomposer is used for many electrolysers arranged in series electrically. $E_1$, $E_2$, $E_3$ . . . $E_n$ are electrolysers respectively and D is an amalgam decomposer commonly used for the said many electrolysers; C is a transporting device capable of transporting only mercury insulated from electric current passing through the flow ing amalgam or mercury; P or P′ is a mercury pump, the position of which may be set suitably in accordance with each type of the electrolytic cell, if necessary; 1 is a pipe; *d* is a mercury distributer. The said transporting device C is provided respectively in the paths along which amalgam is brought from the electrolysers to the amalgam decomposer and at the same time it is also provided in the paths along which mercury is led from the decomposer to the electrolysers through a pipe and mercury distributer. In this case, of course, any suitable mercury distributer is employed, consisting of an adjusting valve or weir capable of adjusting the rate of flow of mercury.

Particularly, there is no limitation regarding the type of mercury transporting device, so far as it transports mercury exclusively while insulated from electric current.

Referring to two types of embodiment as illustrated in the drawings, the process for operating electrolytic cells according to the present invention will be described.

*Example 1*

Figure 3:
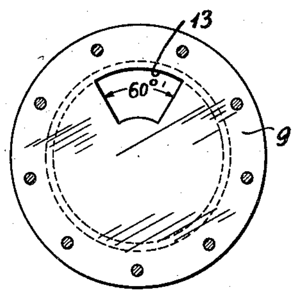
Figs. 2 to 5 illustrate by way of example one embodiment of horizontal type mercury transporting device used in the process for operating electrolytic cells according to the present invention.
Figure 4:
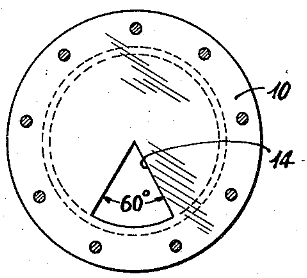
Figure 2:
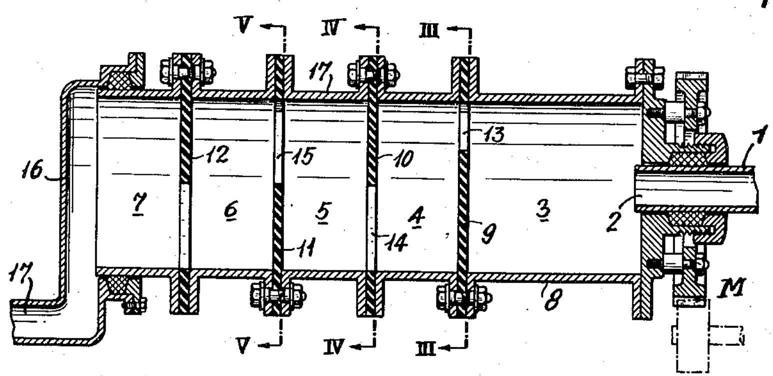
Figure 5:
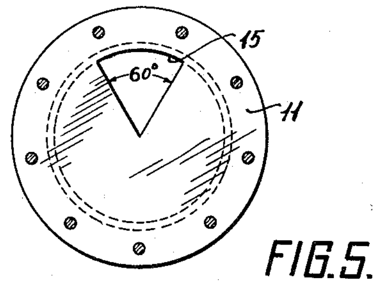

This example represents one example of the embodiment of the present invention, where the horizontal type mercury transport device is employed, as illustrated in Figs. 2 to 5. The amalgam having passed through the lead pipe 1 is introduced to the mercury transport device from a mercury inlet 2 made of insulator or metal. Said lead pipe 1 and inlet 2 are fabricated, for instance, from 1¼ inch gas pipe. The mercury transporting device consists of a rotary cylinder, laid out horizontally or in an inclined position. Inside of the transporting device, several, for instance, four partition walls 9, 10, 11 and 12, 4.5 mm. thick and made, for instance, of ebonite are inserted respectively between the sections of the external wall of rotating cylindrical body 8 made from, for instance, 6 inch gas pipe with tight fit so that several, for instance, five compartments 3, 4, 5, 6 and 7 may be constituted therein. The said rotating cylindrical body 8 is made to revolve by means of any suitable rotating apparatus M. In each of these partition walls, there are pierced respectively openings 13, 14 and 15—of suitable shape through which mercury is made to flow. The shape and position of said openings are so designed that the rotation of the transporting device will make the mercury flow from one compartment to the next, while not allowing the mercury in one compartment to communicate with the mercury in another compartment. For instance, an opening of frustum of sector 13 as shown in Fig. 3 is in the middle upper position of partition wall 9. In the partition wall 10, a sectorial opening 14 is disposed in the middle lower position thereof as shown in Fig. 4. And in the partition wall 11, an inverted sectorial opening 15 is provided in the upper middle position thereof as shown in Fig. 5. Further, when partition walls 9, 10 and 11 etc. are secured to the external wall of rotating cylindrical body 8, the upper limit of said opening 13 is aligned with the inner surface of the cylindrical body 8, the lower limit of opening 14 and the upper limit of opening 15 are similarly aligned with the inner surface of cylindrical body 8. In short, those openings are alternatively properly positioned. And in actual operation it is preferable that the distance from the inlet 2 to the partition wall 9 of the first compartment 3 is designed to be about two times the width of each one of four other compartments 4, 5, 6 and 7.

Thus, mercury having flown into the transporting device first enters the first compartment 3 and then the next compartment 4 as the transporting device rotates. In this case, the amalgam or the mercury in the third compartment 5 is insulated electrically from the mercury or the amalgam in the first and the second compartments 3 and 4 by the partition walls 9 and 10 made of insulating material. With further rotation of the transporting device, the amalgam or the mercury flows from the second compartment 4 into the third 5, where the amalgam or the mercury may flow through the opening between the second and the third compartments to and fro, whereas the amalgam or the mercury in those compartments is insulated from that of the first compartment 3 similarly as before by a partition wall made of insulating material. Thus, the amalgam or the mercury having flown into one compartment is transferred gradually through the succeeding compartments to the front end of the transporting device under electrical insulation, finally into the collector 16 made of insulating material or metal attached to the other end of the cylindrical body 8 and flows outside through a delivery pipe 17 connected thereto.

By means of the transporting device having the aforementioned construction and function, the amalgam or the mercury can be transferred forwards under electrical insulation. Such a transporting device is provided before and after the electrolyser and the said electrolyser is itself insulated electrically from other elements of the plant, several such electrolysers being connected in series and one common amalgam decomposer being employed for carrying out the electrolysis.

Design data for several examples of such a transporting device are as follows:

(*a*)

Diameter of rotating cylindrical body ---------- 6 inches.
Number of revolutions ---------- 16 R. P. M.
Inclination of rotating cylinder ---------- None (horizontal).

| Quantity of flowing mercury (litres/minute) | Leakage current at 3.9 volts of potential difference before and after the transporting device (ma.) |
|---|---|
| 3.38 | 0.6. |
| 4.28 | 0.4. |
| 4.95 | 0.5. |
| 5.92 plus | Short circuit. |

(*b*)

Diameter of rotating cylindrical body ---------- 6 inches.
Number of revolutions ---------- 23 R. P. M.
Inclination of rotating cylinder ---------- None (horizontal).

| Quantity of flowing mercury (litres/minute) | Leakage current at 3.9 volts of potential difference before and after the transporting device (ma.) |
|---|---|
| 4.66 | 0.6. |
| 5.36 | 0.6. |
| 6.02 | 0.8. |
| 7.62 plus | Short circuit. |

(*c*)

Diameter of rotating cylindrical body ---------- 6 inches.
Number of revolutions ---------- 23 R. P. M.
Inclination of rotating cylinder ---------- 5/100.

| Quantity of flowing mercury (litres/minute) | Leakage current at 3.9 volts of potential difference before and after the transporting device (ma.) |
|---|---|
| 5.02 | 0.7. |
| 6.49 | 0.6. |
| 6.98 | 0.9. |
| 8.09 plus | Short circuit. |

It may be understood from the foregoing that the transporting device under (*a*) can be employed satisfactorily for an electrolytic cell where the quantity of circulating mercury through the electrolyser is 4.95 l./min.; the transporting device under (*b*) can also be employed satisfactorily for an electrolytic cell where the quantity of circulating mercury through the electrolyser is 6.02 l./min.; and the transporting device under (*c*) can similarly be employed satisfactorily for an electrolytic cell where the quantity of circulating mercury through the electrolyser is 6.98 l./min.

*Example 2*

Figure 6:
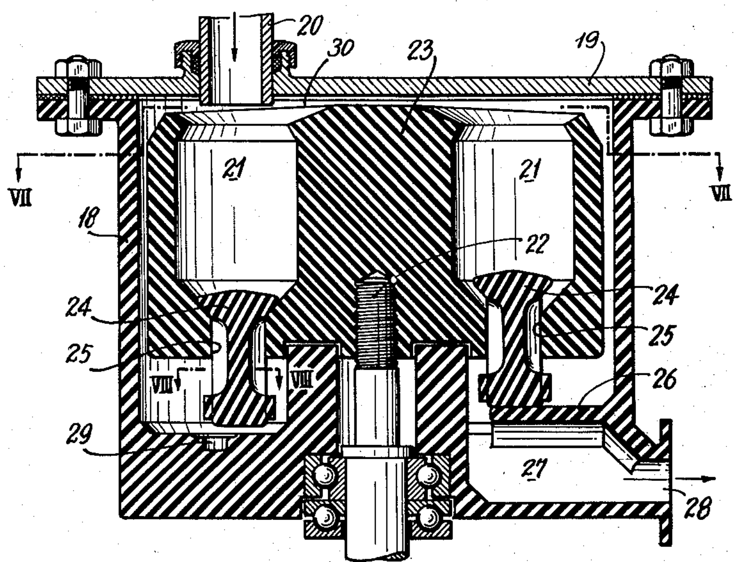
Figure 7:
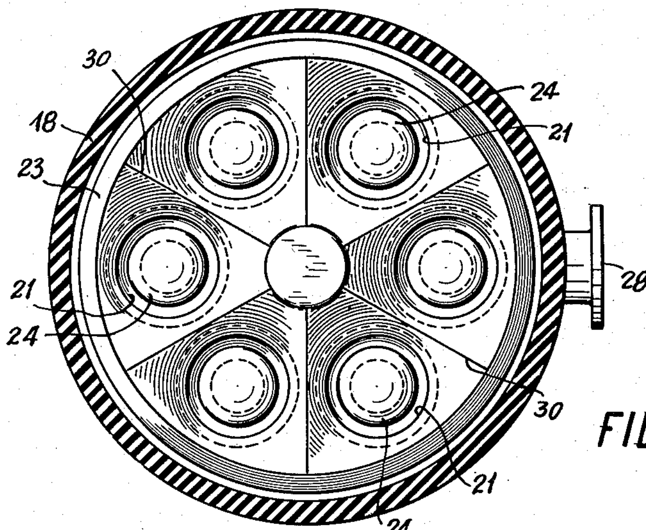
Figure 8:
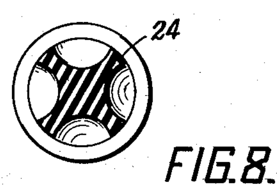

This example represents another embodiment as illustrated in Figs. 6 to 8 where the vertical type mercury transporting device is used. The amalgam from the electrolyser passes through a pipe 20 passing through the cover 19 which is tightly secured to the casing 18 made of metal or insulating material, with packing of insulating material between them. Pipe 20 enters in a mercury reservoir 21 positioned directly below said leading pipe 20.

In the casing 18, two or more of the aforementioned mercury reservoirs are provided in series with their centers lying on a circle in a rotating body 23 made of insulating material, which is rotated about a vertical rotating axis 22. In the drawings, six cylindrical mercury reservoirs 21 are shown. On the V-shaped bottom of each individual mercury reservoir a funnel shaped stop valve 24 made of insulating material is so disposed in a bore of the bottom that it may move upwards and downwards freely, and it descends normally by its own weight and closes the bore or passage 25 of the bottom of the mercury reservoir 21.

The speed of the rotating body 23 made of insulating material is appropriately determined depending upon the quantity of mercury flowing therein and the size of mercury reservoir. Thus, amalgam is poured successively into the reservoir 21 which is brought just below the inlet of the mercury leading pipe 20 while being rotated and fills it. Between one reservoir and the next of this rotating body 23, there are raised portions which slope from the highest ridges 30 towards both mercury reservoirs. Thus, the flowing-in mercury is designed to flow entirely into those reservoirs. Further, on the exit side a lifting device 26 for lifting the stop valve is secured to the casing 18 at a proper location of the lower part of the rotating body 23 made of insulating material.

Thus, the mercury reservoirs 21 filled with amalgam are shifted successively by rotation from the inlet side toward the outlet side and to a predetermined position. As any one of the reservoirs 24 is brought gradually to the said position the bottom end of the corresponding stop valve 24 ascends gradually along the inclined surface of the lifting device 26 secured to the casing 18 on the lower part of rotating body 23, while the bottom opening portion 25 of the reservoir 24 is opened gradually by the gradual ascending of the stop valve 24 and the mercury in the reservoir flows out of its bottom, down into the exit pipe 27 provided at the lowest part of the casing 18 and then is led outwardly. Finally it flows out of the exit 28 of the mercury transporting device.

On the other hand, if amalgam leaks at the bottom of the casing at the flowing-in side, it is collected and led to the exit pipe 27. A trough for leakage mercury 29 is provided for such a purpose, thus the leaked mercury being led to the exit pipe 27.

When a transporting device having the aforementioned construction and function is provided between each one of the electrolysers and a common amalgam decomposer, and also between the mercury distributer interconnected with the amalgam-decomposer and each one of the electrolysers, each reservoir being electrically insulated with insulating material, the amalgam or the mercury is transmitted, while the electric current is prevented from flowing through said amalgam or mercury which is insulated by the transporting device made of insulating material.

Therefore, by the provision of said transporting device in such a manner as is illustrated in Figs. 6 to 8, two or more than two electrolysers may be operated simultaneously with one amalgam decomposer.

Design data for several examples of such a transporting device are as follows:

(*d*)

| | |
|---|---|
| Diameter of mercury conducting pipe **20** | 1 inch gas pipe. |
| Size of mercury reservoir | Inner dia.: 55 mm.; height: 85 mm. |
| Number of mercury reservoirs | 6. |
| Diameter of exit of mercury transporting device **28** | 1¼ inch gas pipe. |
| Number of revolutions | 4 R. P. M. |

| Quantity of flowing mercury (litres/minute) | Leakage current at 3.9 volts of potential difference before and after the transporting device (ma.) |
|---|---|
| 3.40 | 0.7. |
| 3.58 | 0.7. |
| 4.20 | 0.9. |
| 4.85 plus | Short circuit. |

(*e*)

| | |
|---|---|
| Diameter of mercury conducting pipe **20** | 1 inch gas pipe. |
| Size of mercury reservoir | Inner dia.: 55 mm.; height: 85 mm. |
| Number of mercury reservoirs | 6. |
| Diameter of exit of mercury transporting device **28** | 1¼ inch gas pipe. |
| Number of revolutions | 6 R. P. M. |

| Quantity of flowing mercury (litres/minute) | Leakage current at 3.9 volts of potential difference before and after the transporting device (ma.) |
|---|---|
| 3.60 | 0.8. |
| 4.92 | 0.9. |
| 6.45 | 0.9. |
| 7.25 plus | Short circuit. |

(*f*)

| | |
|---|---|
| Diameter of mercury conducting pipe **20** | 1 inch gas pipe. |
| Size of mercury reservoir | Inner dia.: 55 mm.; height: 85 mm. |
| Number of mercury reservoirs | 6. |
| Diameter of exit of mercury transporting device **28** | 1¼ inch gas pipe. |
| Number of revolutions | 7.1 R. P. M. |

| Quantity of flowing mercury (litres/minute) | Leakage current at 3.9 volts of potential difference before and after the transport ing device (ma.) |
|---|---|
| 4.90 | 0.9. |
| 6.50 | 0.8. |
| 7.25 | 1.2. |
| 8.05 plus | Short circuit. |

It may be understood from the foregoing that the transporting device under (*d*) can be used satisfactorily for an electrolytic cell where the quantity of circulating mercury through the electrolyser is 4.2 l./min.; the transporting device under (*e*) can also be used satisfactorily for an electrolytic cell where the quantity of circulating mercury through the electrolyser is 6.45 l./min.; and the transporting device under (*f*) can similarly be used satisfactorily for an electrolytic cell where the quantity of circulating mercury through the electrolyser is 7.25 l./min.

The foregoing description deals with only a few examples of the process for operating electrolytic cells according to the present invention. However, any suitable processes may be adopted without departing from the spirit and scope of the present invention. For instance, a transporting device similar in construction to a piston, made of insulating material may be used to conduct a desired electrolysis.

In short, the process of this invention is a process for operating electrolytic cells at high efficiency by using a plurality of electrolysers to a single amalgam decomposer.

Therefore, for the present purpose, the operation of the electrolytic cell may be conducted as follows:

For instance, with the use of one amalgam decomposer for two electrolysers, it is possible not to use the transporting device before and after one of the two electrolysers, or with the use of three such electrolysers, it is possible not to use the transporting device to one of the three electrolysers and so on.

What we claim is:

1. An interrupter for the flow of amalgam or mercury between portions of an electrolytic alkali-chlorine system, wherein such portions are to operate at different electrical potentials, including a casing having an inlet and an outlet for the admission and delivery of such amalgam or mercury, means for subdividing the interior of the casing into a plurality of mutually insulated compartments arranged in series between said inlet and said outlet, means associated with said subdividing means for establishing a communicating path for the flow of such amalgam or mercury between each of said compartments and an adjoining compartment and thereby interconnecting each compartment with its adjoining compartment and establishing therebetween a path along which electric current might flow, said means subdividing said casing into compartments acting to interpose an insulating barrier between said interconnected compartments and the other compartments of said series in said casing, and means causing said compartments to communicate with an adjoining compartment in sequence whereby said compartments operate to cause flow from said inlet to said outlet while at all times interrupting any continuous electrical path from said inlet to said outlet.

2. A flow interrupter as claimed in claim 1, said casing being designed as a substantially horizontal cylinder arranged for rotation about the axis thereof.

3. A flow interrupter as claimed in claim 2, said compartment nearest to said inlet of said horizontal cylinder forming said casing being substantially wider than the others of said compartments.

4. A flow interrupter as claimed in claim 3, said subdividing means being designed as a plurality of circular partition walls consisting of insulating material, said partition walls having openings arranged alternately at opposite sides thereof.

5. A flow interrupter as claimed in claim 4, said partition wall arranged between said compartment nearest to said inlet and the next following one of said compartments, having an opening shaped as part of a circular sector and arranged in the outer portion of said circular partition wall, said openings in the other of said circular partition walls being shaped as circular sectors extending, respectively, from the centers of said circular partition walls to the marginal portions thereof.

References Cited in the file of this patent

UNITED STATES PATENTS

| | | |
|---|---|---|
| 636,234 | Baker | Nov. 7, 1899 |

FOREIGN PATENTS

| | | |
|---|---|---|
| 16,358 | Great Britain | July 23, 1902 |
| 503,288 | France | Mar. 15, 1920 |
| 264,290 | Switzerland | Jan. 3, 1950 |

OTHER REFERENCES

"Chemical Engineering," July 1952, pages 265, 266. (Copy in Sci. Lib.)